Nov. 4, 1969 J. C. MYRICK 3,476,876

INFORMATION ENCODING AND TRANSMITTING APPARATUS

Filed April 8, 1966 4 Sheets-Sheet 1

Joseph C. Myrick
INVENTOR
by: Homer R. Montague, Atty.

Nov. 4, 1969 J. C. MYRICK 3,476,876

INFORMATION ENCODING AND TRANSMITTING APPARATUS

Filed April 8, 1966 4 Sheets-Sheet 2

Joseph C. Myrick
INVENTOR
by: Homer R. Montague, Att'y.

INVENTOR:
Joseph C. Myrick,

BY Homer R. Montague
ATTORNEY

Joseph C. Myrick
by: Homer R. Montague Att'y 3,476,876
INFORMATION ENCODING AND TRANSMITTING APPARATUS Joseph C. Myrick, Gaithersburg, Md., assignor to Rixon Electronics, Inc., Silver Spring, Md., a corporation of Maryland Filed Apr. 8, 1966, Ser. No. 541,381
Int. Cl. H04l 15/18, 15/12, 15/24
U.S. Cl. 178—17 8 Claims

ABSTRACT OF THE DISCLOSURE

Data encoding and transmission apparatus comprising a console containing a plurality of narrow settable-tape modules for encoding multi-bit messages by sliding of the tapes to set positions, each tape bearing reflective spots and perforations in a sequence which provides a unique multi-bit code pattern for each tape position, scannable by a transversely moving carriage to sense at precisely defined travel positions the spot patterns of the tapes in sequence, and each module containing a light-trapping formation inwardly of the tape to cooperate with the tape perforations in improving the signal-to-noise ratio supplied to the sensing means on the carriage.

This application pertains to apparatus for use at a terminal of a transmission channel or data processing system, and by means of which an operator can set up or preselect complete messages consisting of strings of pulse groups. The apparatus allows the operator to make the necessary selections of sequential code groups in any desired order of selection, and to check and verify (or make corrections in) the selected groups, and thereafter cause the initiation of the feeding out or transmission of these verified code groups at a proper cyclical speed or cadence which is suitable for use in transmission over communication channels and by data processing apparatus at the far end of the channel.

Apparatus of this general kind is covered by U. S. patent application S.N. 400,694, filed Oct. 1, 1964, now patent No. 3,414,670 issued Dec. 3, 1968, in the name of Harry Place, and owned by the assignee of the present application. The entire disclosure of that prior application is to be understood as incorporated herein by reference, the present application being directed to improvements yielding greater flexibility, utility and dependability in apparatus of this type. To aid in an understanding of the improvements herein, brief reference will be made to specific points of departure which, taken together, constitute the inventive subject matter of this present case.

As in the previous application, the digital information to be transmitted is set up by the adjustment of a plurality of looped encoding tapes arranged side by side, for adjustment by a stylus or the like to bring the selected code group combinations into aligned positions for later scanning by a traveling carriage. The previous arrangement mounted the tapes upon sets of spaced rollers carried on a pair of parallel shafts extending lengthwise of the machine, with a tubular light source and necessary optics being encircled by the totality of the loops of the coded tapes. This arrangement required complete disassembly whenever tapes had to be rearranged to accommodate a desired format of the messages to be transmitted. In accordance with the present invention, each tape is carried by a separate readily removable module so that they can be removed and replaced as individual elements. Since this new arrangement precludes the use of a common light source or other elements threaded through the tape loops, the present invention further disposes the sources of read-out illumination directly on the traveling carriage, there being preferably one source of spot illumination for each of the possible bit positions to be read out.

It will be seen from the above that whereas the previous apparatus utilized light transmitted through holes in the tape for code selecting purposes, the present invention utilizes light selectively reflected (or not reflected) by spot arrays of the tapes. While it would be possible to obtain this reflective discrimination solely by the proper placement of relatively light and dark areas on the tapes, the present invention achieves a very significant gain in signal-to-noise ratio by making the outer surface of the tape highly reflective where a photocell is to be energized, and forming the regions where a photocell is not to be energized as perforations in the tape. Sensing light from the carriage thus passes through the tape wherever a hole exists, and is optically trapped inside the body of the module. By analogy to the zero reflectivity of a small hole in the wall of a dark cavity, practically perfect detection of the reflective spot locations is assured.

It has heretofore been proposed to select and transmit multi-bit binary code groups in a desired succession by providing aligned strips of material which, when slid relative to one another lengthwise will establish a linear sequence of code-hole or dash-and-dot perforations extending across all of the strips for sensing by a traveling stylus or the like. In such devices, the widths of the strips must be sufficient to enable the full binary code sequence of holes and blanks (or dot-holes and dash-holes) for each character (letter, digit, etc.) to be provided within the width of the strip, and such a sequence has to be provided for each character-position along each strip. Also, in such devices (exemplified by U.S. Patent 2,885,664), the hole-sensing element has to operate several times during its passage across each strip-width, and either the code strips must be unduly wide, or the sensing device must have an excessive fineness of touch (or resolving power, so to speak), or both. An assembly of strips capable of formulating a lengthy code message must be correspondingly wide, and soon becomes of useless proportions.

Therefore, the present invention preferably employs a coding scheme in which each strip carries only a single lengthwise array of code spots (typically, life-reflective spots) whose size can be as large as permitted by the strip width. The arrangement of these spots, and their intervening holes (non-reflective areas), is chosen so that for each longitudinal position of a strip, a unique combination of spots and holes is presented to the sensing carriage, which scans simultaneously a fixed number (several) of the spot- positions, the number depending on the number of code bits constituting the standard code group. Accordingly, the strips themselves are serially scanned one after another, but the code bit groups of the various strips are scanned in parallel, the scanner read-out being serialized (if desired) by a commutator-like device such as a shift register synchronized with the scanner motion, or the like. Thus, a choice as to the output sequence is a further characteristic of the invention; it may be, for example, bit-parallel and word-sequential, as well as fully serial. Read-out by magnetic spot-sensing means or other systems could also be used, if desired.

Another basic improvement provided by the present invention lies in the manner of driving the traveling carriage across the array of tapes. The previous application disclosed the use of a traveling motor-driven sprocket belt for this purpose, which led to inaccuracies in the registration of the read-out position relative to each tape, and to unnecessary complexity. The present application substitutes a drive system in which the carriage has journaled thereon a substantially single-turn section of a worm which mates with a helical-toothed rack section placed parallel to the path of carriage travel. The worm element has a square or other non-circular central hole which mates slidingly with a corresponding non-circular shaft extending throughout the path of carriage travel. By this arrangement, which is extremely economical to construct, the carriage is caused to travel in precise synchronism with the rotation of the square drive shaft, so that the carriage position can be precisely related to an optical switch operated by slits in a drive gear secured to one end of the shaft. By providing such slits with the proper angular spacing about the drive wheel, the transmission of the bit sequence from each tape can be accurately timed to occupy the interval during which the carriage moves from the reading position at one tape to the reading position at the next tape. The instant of carriage travel at which the spots on each tape are sensed is conveniently determined by the angular position of a further light-switch controlling aperture located at a different radial distance from the center of the drive wheel. In brief, when the carriage reaches a centered position relative to the selected array of code holes in each tape, the array is sensed to cause the setting up of this code combination in a suitable electric storage device, and this stored information is then read out, one stage or bit at a time, under control of the first light switch mentioned above.

The single-turn worm and helical rack drive mentioned above yields an additional advantage, namely the ability to operate microswitches or the like at precisely selected positions of carriage travel. Such switches, when intended to be operated directly by an element fixed on the traveling carriage, are extremely critical to adjust because of changes in contact travel, wear and the like. By arranging for the operation of these switches by a leading edge or nose of the protruding one-turn thread of the worm, switch operation at a definite angular position of the drive shaft (as well as of the gross longitudinal position of the carriage) is achieved, and micrometric accuracy of switch operation results.

Yet another object is to provide a multi-column or "tubular" form of data entry set in which an initial selection of a code group (which may designate the kind or nature of the message to be transmitted) will, if desired, automaticallly signify to the operator which of the other columns, or group of columns, will require data entry operations in order to formulate a complete message.

Another object of the invention is to provide the display panel with windows above or at the "heads" of the data-selecting modules or groups thereof to indicate the kind of information the operator is to set up in those modules, and means for changing the designations appearing in those windows to enable selection of any of several "formats" of messages.

A further improvement provided by the present invention is an arrangement by which a printed record may be made of the sequence of clear-text characters transmitted during each operation of the apparatus. Such a record is invaluable in many applications of data-transmitting terminals, and is obtainable by very efficient and economical means in connection with the arrangement according to the invention.

The invention will be better understood by referring now to the accompanying drawings showing preferred embodiments of the invention, which are not, however, intended as limitations on the scope. In these drawings.

Figure 1:
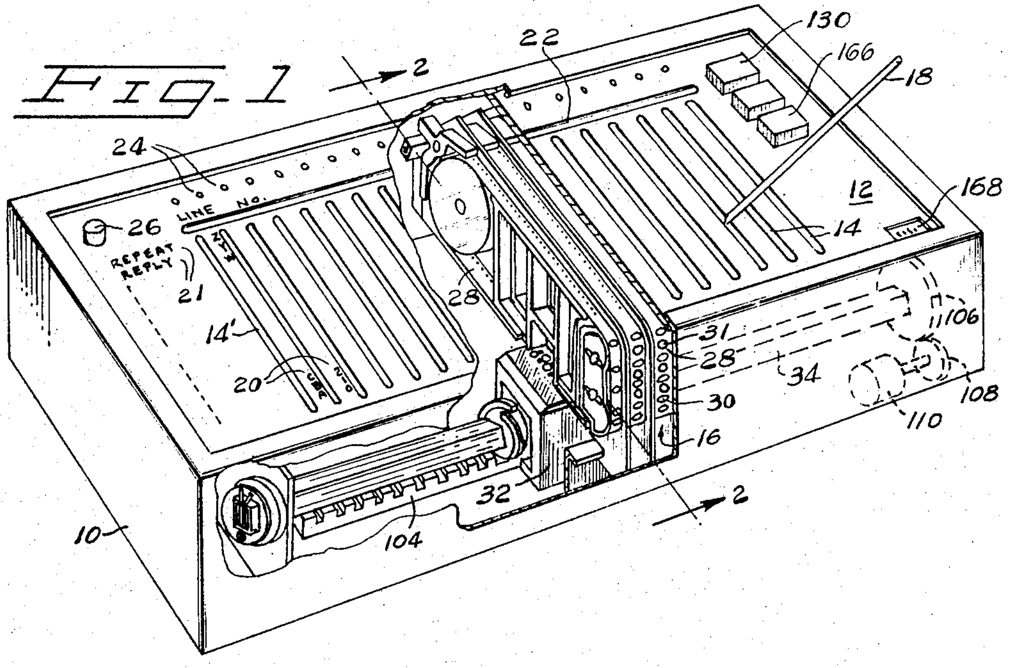
FIG. 1 is a perspective view, partly broken away, of the complete data entry and code-generating unit.

Referring first to FIG. 1 of the drawings, numeral 10 designates the over-all casing of the code generating unit, whose top surface panel 12 is perforated by a series of parallel slots 14, each corresponding to one selectable code group device 16, these devices being set in turn by inserting a stylus 18 (or a ball-point pen or the like) in the respective slots at the desired character position and moving the stylus to the lower (forward) limit of the slot. The proper position for insertion of the stylus in each slot is indicated by a scale 20 marked alongside each slot, these being scales of letters, digits or other symbols appropriate to the intended use of the apparatus. The stylus motion, as will appear, serves to move a code-selecting flexible tape to establish a spot code pattern for transverse scanning. All of the devices or modules 16 are physically identical and interchangeable, although their code tapes may be differently marked so that some modules are employed solely for letter-character transmissions, some solely for digit-character transmission, etc. Separate coding of letters and digits is not needed if the receiving device, such as a computer, is conditioned to recognize the proper meaning according to the position, within a complete message, of a particular code group. This will normally be the case where the system calls for a fixed number of code groups per transmitted message, any idle or unselected modules generating an arbitrary code group to maintain the fixed message length. In the case of modules used to select a single digit, for example, the panel slots 14 may be made appropriately shorter than for alphabet selections.

In the particular embodiment being described, the code groups established or selected by devices 16 will ultimately be transmitted by scanning the devices from left to right in FIG. 1, and the module beneath the left-most slot 14' selects a code group designating the kind of transaction with which the transmission is concerned. The wide space on panel 12 to the left of slot 14' provides adequate space for a listing 21 of the names or abbreviations of such transactions, and also provides space beneath the panel for a set of relatively unchanging code-group generating units which may, for example, generate code groups serving to identify the transmitted message with its station of origin.

Certain transactions, or classes of messages, will not require the setting of all of the devices 16, but only those at certain columns of the panel display, as mentioned above. By switching means to be described below, the operation of selecting a transaction at slot 14' may, in addition to selecting a particular code group identifying the kind of transaction, selectively energize lamps associated with the other devices 16, to provide (in combination with indicating means at each such device) an illuminated display through a transverse panel slot 22, positioned at the heads of the slots 14. This selective illumination would then serve to advise the operator as to which of the modules are required to be set, and may also preferentially illuminate, through slot 22, each respective character, digit, symbol or the like which each device is set to generate. However, this selective illumination feature is not essential to the broader purposes of the invention, and the character markings on the various tapes are also directly visible through the slot 22 under ordinary room illumination levels.

Since the code-generating scanning of the devices 16 is not initiated until the operator has first set all the required devices 16 and checked their settings as displayed in slot 22, any erroneous selection is readily found, and can be corrected individually by inserting stylus 18 in a panel aperture 24 positioned in alignment with each respective slot 14, to reset the corresponding device to its rest (non-selected) condition. The correct setting for that device is then obtained as already described. Manual resetting of the entire group of devices 16 is obtained, when required, by depressing button 26, and such complete resetting can also, in a modified form of the device, be obtained automatically at the conclusion of each actual transmission.

FIG. 1 is broken away to show the disposition of typical code-group generating devices 16, each consisting of a relatively thin, flat unit so that when stacked face to face within the cabinet or housing 10, their center-to-center spacing corresponds to that of slots 14. Each device 16 provides a movable tape 28 perforated to receive the tip of stylus 18 at any of plural positions along a slot 14, the tape carrying visible indicia of the letters, digits or the like for display through slot 22, and also carrying coded sequences of spots 30 and holes 31 positioned by the tape 28 for scanning by an array of light sources and photocells on a carriage 32, movable transversely of devices 16 by means to be described below.

Figure 2:
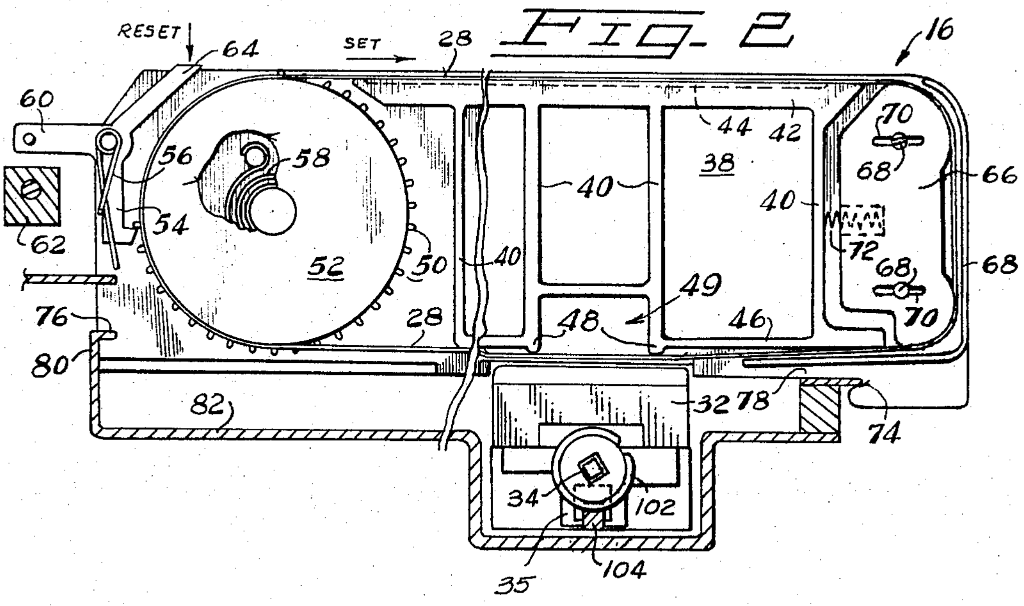
FIG. 2 is a sectional view taken along line 2—2 of FIG. 1, showing one of the selecting modules essentially in side elevation, with a part broken away and certain mounting details omitted for clarity.

As better shown in FIG. 2, each unit device or module 16 comprises a thin frame element 38, typically of molded plastic reenforced by stiffening ribs 40 connecting also an upper tape table 42 (slotted at 44 to guide the tip of stylus 18 and to limit its setting motion in the direction of the "set" arrow) and a lower tape table or guide 46 whose projecting bosses 48 define an accurate positional plane for the code spots and holes during scanning travel of the carriage 32. The cavity designated 49 is a light trap for sensing light passing through code holes in the tape during sensing. Tape 28 is an endless loop, and by its sprocket-hole perforations (engaged in setting by the stylus tip) engages teeth 50 on a sprocket wheel 52. These teeth cooperate with a ratchet pawl 54 pivoted on a stud secured to a partial back plate integral with the molded frame element 38, and urged by spring 56 to hold wheel 52 in any set position against the restoring force of a light spiral spring 58 within the open interior of the wheel. An arm 60 on pawl 54 is engageable by a common or universal resetting bar 62 pivoted in the casing to reset all the unit devices (by depression of button 26, FIG. 1) when desired, and an arm 64 of each pawl has its tip positioned to lie beneath a corresponding reset aperture 24 (FIG. 1), for resetting any individual unit.

The frame 38, ribs 40, tape tables 42 and 46 and the pivot studs for wheel 52 and pawl 54, are preferably a one-piece molding of suitable plastic material. A tape-tensioning shoe 66 is mounted for limited motion by fixed screws 68 passing through parallel slots 70, and is urged to the right as by a compression spring 72. Formations such as slots 74, 76 are molded in frame 38 to cooperate with sheet metal rails 78, 80 extending transversely within the housing and forming part of an internal chassis or framework 82, and thus to allow the code selecting devices 16 to be held accurately in alignment for scanning, yet removed or replaced easily in accordance with any desired code-group sequence or format (alphabetic, numerical, etc.) required by a particular application.

In this connection, it is noted that the unit devices or modules will ordinarily differ amongst themselves only in that their tapes may carry specified display indicia (such as letters, numerals or symbols), and it is not necessary for the array of binary spots to vary from tape to tape, so long as the basic coding scheme adopted provides for all of the code groups required by the number characters, digits or symbols used in the system. The tape loops 28 are preferably made of tough but flexible plastic such as "Mylar," with their ends welded together. The code positions are preferably reflective spots 30, when optical scanning is employed as described herein, and may be formed by coating the tape at the prescribed spot areas. A typical spot and hole sequence will be described below.

Figures 3, 4, 5, 6:
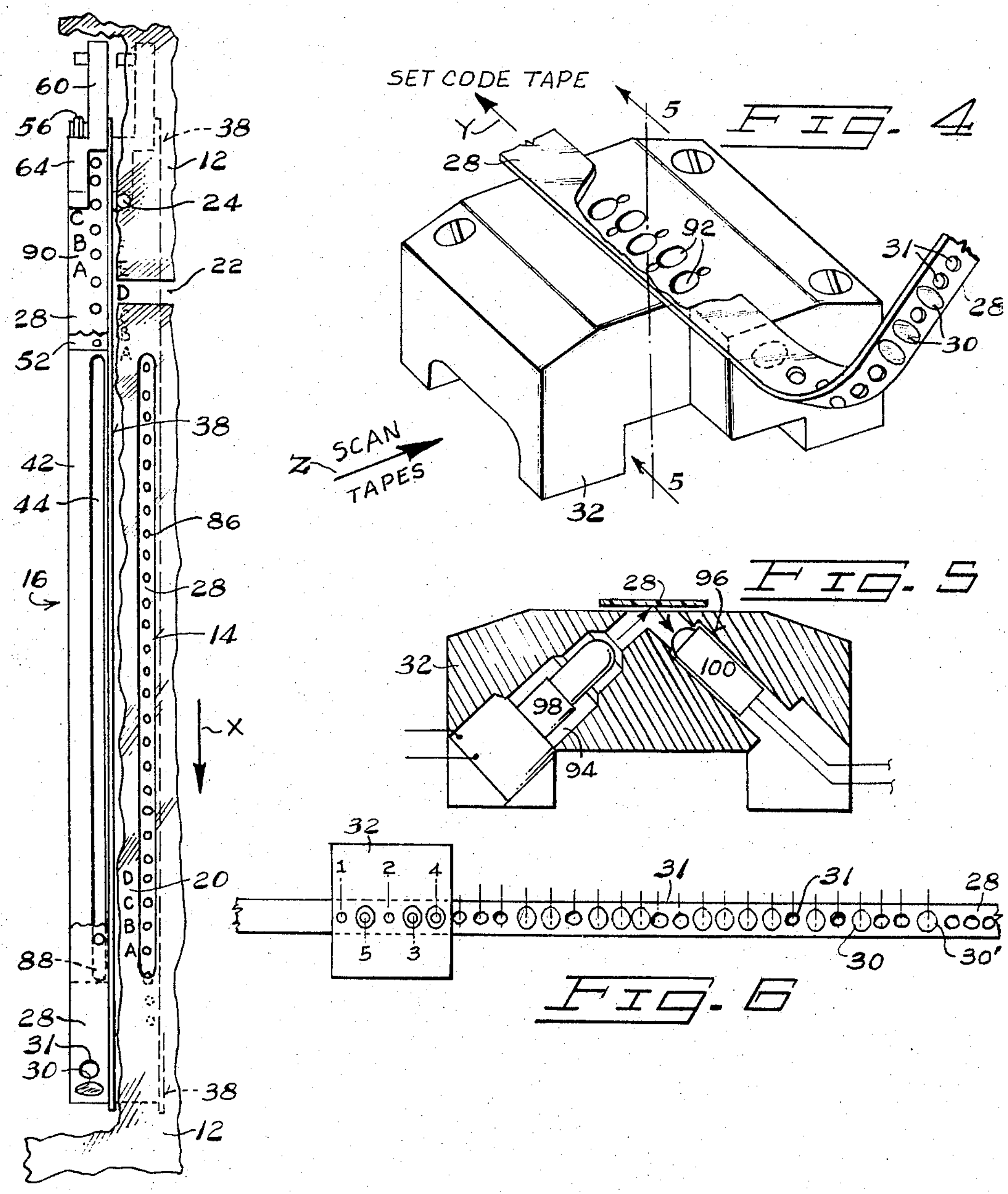
FIG. 3 is a fragmentary plan view showing the relation of two of the selecting modules to one another and to the top plate of the device.
FIG. 4 is a perspective view of the photoelectric code scanner, indicating the read-out position thereof with reference to a code strip or tape of one of the modules.
FIG. 5 is a sectional view of FIG. 4 taken along the line 5—5 thereof.
FIG. 6 is a diagram illustrating the sequence of single-row coding spots and apertures along the code strip, to provide a unique code combination output for each position of each strip as it is scanned by the traveling carriage.

The arrangement of successive unit devices or modules 16, and their construction, is detailed in FIG. 3, as viewed from above panel 12 and broken away at certain regions to show underlying structure. Typically, units 16 have an over-all length slightly less than 8 inches, and lie side-by-side on 5/16 inch centers, the tapes 28 being 1/4 inch wide. The cover panel 12 in FIG. 3 is shown broken away where it would overlie and obscure the left-most module unit, and the tape 28 of that unit is also shown broken away to expose the underlying tape table 42, whose shallow groove 44 receives the tip of the operator's stylus when it has passed through the panel slot 14 and into a selected sprocket-hole perforation 86 of the tape. The depth of the groove 44 positively limits the insertion of the stylus through the tape, and guides it during its motion toward the forward edge of the top panel as illustrated in FIG. 1. Also, the groove 44 terminates at such a position, as indicated by numeral 88 in FIG. 3, that the stylus cannot be moved beyond a point corresponding to the desired total travel of the tape. That is, the total length of groove 44 is such that when the stylus has been inserted in the selected tape perforation 86 (denoted to the user by the designation 20 of indicia marked on panel 12 adjacent each slot 14), and then moved to the forward position corresponding to the end of groove 44, the stylus motion will be positively stopped by the end of the groove, leaving that tape detented in its "set" position.

As also shown in FIG. 3, the tapes 28 carry, to the left of the row of perforations 86, a corresponding row of indicia 90 (letters are shown in this figure) so that the proper designation of the set position of each tape will be visible to the user through panel slot 22, as indicated by the letter D in the case of the second module unit 16 from the left in this figure.

FIG. 4 shows in an enlarged fragmentary perspective view the relation of a tape 28 to the scanning carriage 32. Since the tape-setting direction of the stylus is downward, or in the direction of arrow X in FIG. 3, the direction of motion of its lower pass, along the bottom of the module, is opposite, as indicated at arrow Y in FIG. 4. The coding "spots" 30 are separated by holes 31 in the underside of this lower pass of the tape, and occupy a portion of the tape length that is exclusive of (and follows) the space devoted to the sprocket-hole perforations 86 and the indicia 90. The arrangement is such that, when any tape has been set, a corresponding set of its coding spots 30 are presented to the upper or sensing face of carriage 32. In the system being particularly described, a total of five of the mark-space bits of the tape are selected for information transmission, and carriage 32 therefore includes five sensing positions spaced from one another along the direction of tape-setting motion. The conventional preliminary "start" bit (a space) and "stop" bit (a mark) to render the coding plan compatible with conventional Teletypewriter encoding may be supplied, if desired, by auxiliary circuitry. The sensing windows of carriage 32, thus aligned beneath the tape, are represented at 92 in FIG. 4.

As better shown in the sectional view of FIG. 5, each sensing window in the upper face of the carriage actually represents the intersection of two bores 94 and 96, one containing a small electric light bulb 98 to illuminate the general region of one code spot position, and the other bore receiving a small photocell 100 such as a silicon P-N photodiode or the like. For compactness, as well as for interchannel optical interference reduction, the five systems of this type are preferably staggered, left for right, as is indicated by the staggering of the visible openings of bores 94 and 96 in FIG. 4. The digits 1 through 5 in FIG. 6 merely indicate the bit positions arbitrarily assigned to the five sensing windows in this particular coding scheme. These windows 92 are, of course, spaced from one another a distance equal to the modular spacing of the code spots 30 and holes 31 of the tapes, which is also equal to the spacing of the sprocket holes 86. It will be obvious to those skilled in the art that a greater or lesser number of code positions may be sensed, and that under some conditions it is not necessary to provide individual light sources on carriage 32 to illuminate the spots. In fact, a single tubular or linear light source positioned along the path of the carriage, or one on either side of that path, may be substituted for some applications.

Tape code-spot arrangement

FIG. 6 shows a typical arrangement of the reflective code spots 30 on tape 28, viewed as from the under side of the tape in FIG. 4, the sensing surface of carriage 32 being indicated schematically with this same orientation. In the tape position shown, spots 30 are exposed at bit-positions 3, 4 and 5, this representing the code pattern for an unselected tape, when the usual start and stop bits have been supplied. Since a step of tape 28 to the left in FIG. 6 will expose the sensing positions for bits 1, 2 and 3 to spots 30, this sequence of "marks" corresponds to letter A. The remainder of the code is indicated by the information given in FIG. 6; for example, when the extreme right-hand spot 30 (here designated 30') is in the sensing position indicated by digit 4, the code for letter V (4, 5) is set up for generation. Four successive steps of the tape to the left will produce the code groups for W, X, Y and Z.

Between the reflective spots 30, the general tape surface is dark, but the available signal-to-noise ratio as sensed by the photocells is greatly increased by providing the intervening holes 31 in the tape. Any light striking between reflective spots 30 then passes into the trapping cavity 49 provided between the bosses 48 (FIG. 2) whose side walls are the dark-colored plastic of which the module (specifically, its ribs 40 in this area) is molded.

For orderly transmission of the code groups selected, the sensing devices in carirage 32 are allowed to initiate code-group generation only during a limited period when the sensing windows are well centered beneath the centerline of the spots 30 on successive tapes, as the carriage moves beneath them in the direction of arrow Z in FIG. 4. There are various ways of thus gating or clocking the sensing operation, the preferred one being made clear following the description of the carriage-drive mechanism.

Carriage drive

FIGS. 1 and 2 indicate generally the way in which carirage 32 is guided beneath the modules 16 so as to scan their respective exposed code groups of spots and holes. Thus, the square cross-section shaft 34 is journalled at both ends in the machine frame, and held against motion in its axial direction. The carriage includes a rotatable bushing having a corresponding square passageway to slide along the shaft 34, the bushing being fixed against endwise motion in the carriage. One end of the bushing has an enlarged hub carrying approximately one turn of a coarse pitch helical rib 102. Fixed beneath and parallel to shaft 34, and so as to be engaged by the helical rib as the hub rotates, is a segment of a helical rack 104. Thus, when shaft 34 rotates, it rotates the helical rib or thread portion 102, which, meshing with the rack segment, causes the hub, the bushing, and hence carriage

32 to traverse a path along the under sides of the modules and their code tapes, in the area in which the code groups have been set up. The carriage has depending legs 35 which slidingly embrace rack bar 104 and maintain the carriage upright in all positions.

Figures 7, 10:
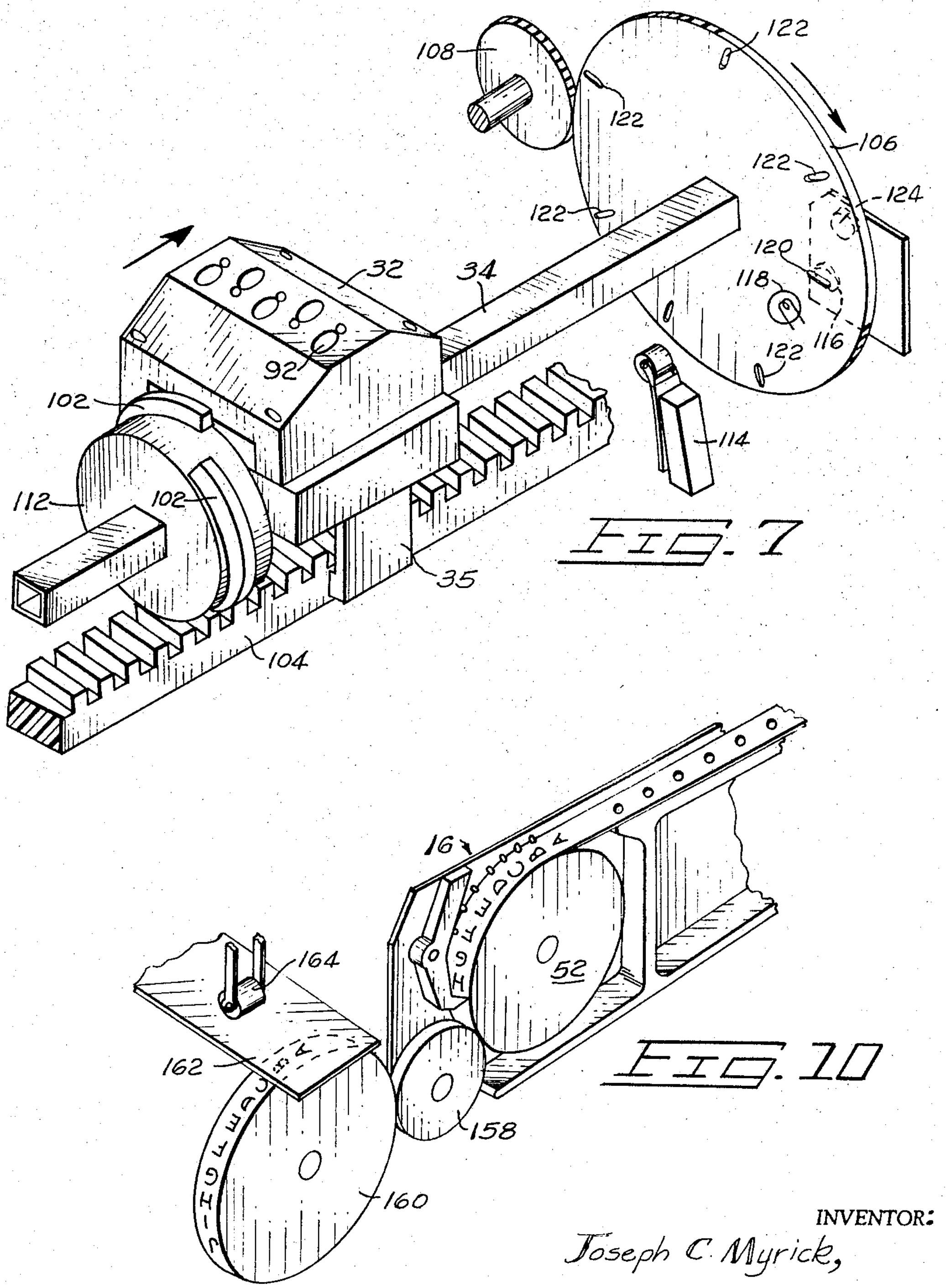
FIG. 7 is a fragmentary perspective view of the essential elements of the carriage drive mechanism and the light-switch commutating or pulse-timing controls.
FIG. 10 is a schematic perspective view of an arrangement for providing a clear-text (letters, numerals and symbols) printed record of each message-transmitting operation of the apparatus.

Shaft 34 carries at one end a gear 106 driven in turn by a gear 108 secured to the shaft of a reversible motor 110. Turning now to FIG. 7, an enlarged view of the carriage drive system is seen. The hub which carries rib or thread section 102 is indicated by numeral 112. Merely by way of example, a typical microswitch 114 is indicated in position to be operated by the leading tip of rib 102 when the carriage has reached a desired position along its guide shaft. Since it is the tip of the rib which actually encounters the operating arm of the microswitch as the carriage approaches the desired switch-operating position, it is obvious that the precision of location of the operating point does not depend merely upon the gross carriage position, but in a finer sense it depends also upon the arrival of the rib 102, during its revoltuion, at a point where its tip engages the microswitch arm along a circumferential path. By selecting the longitudinal position of the microswitch, and its angular location with reference to the axis along shaft 34, any desired point of operation within a small fraction of a turn of the shaft 34 can be obtained.

The "pitch" of thread section or rib 102, and of the rack teeth, is chosen to correspond to the center-to-center spacing of the modules 16, as this causes the carriage 32 to advance from one code-reading position to the next during each revoltuion of the shaft. Therefore, the gear wheel 106 can conveniently be made use of to accomplish the precise clocking of the "read" command, as by the impulse produced when a sensing photodiode 116, mounted on one side of the gear wheel, is briefly exposed to light from a lamp 118 when a narrow slit 120 in the wheel passes in front of the lamp. At a larger radius of wheel 106, it contains several angularly spaced slits 122 positioned to expose a second photodiode 124 at instants accurately spaced during the rotation of the wheel, the output pulses so produced being used to produce a sequential read-out of the sensed code group, as will be described below.

Sensing operation

Figure 8:
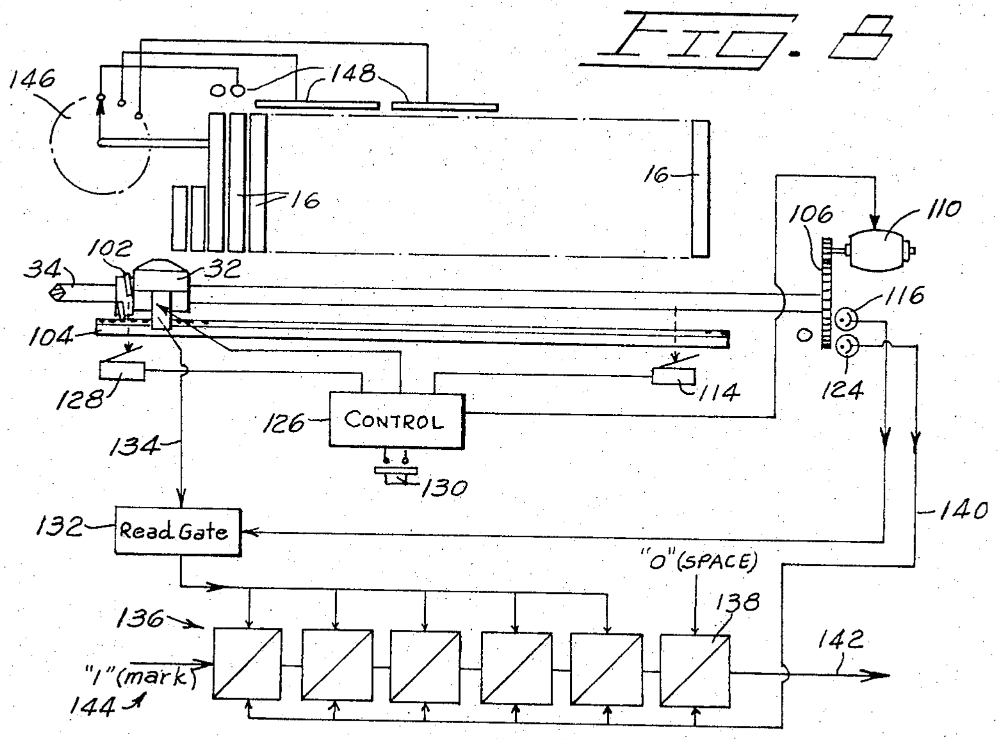
FIG. 8 is a schematic, partly in block form, showing the operating circuits of a complete code-generating apparatus of this type.

The general operating procedure can be followed by turning now to FIG. 8, wherein the same numerals have been used for parts already described. By a suitable control relay circuit 126 known to the art, and the forward and return limit microswitches 128 and 114, the motor 110 is energized for forward (reading direction) travel of carriage 32 when the start switch 130 is momentarily depressed. The carriage 32 will advance beneath the modules 16 in turn, and at a precise instant when its sensing windows are aligned beneath the spots and holes, or codes, of each of the modules, the timing photodiode 116 operates gate circuit 132 to allow the signals of the energized carriage photodiodes to proceed over the set of flexible carriage conductors 134, and hence to set the first five flip-flops of the shift register 136 into respective "1" or "0" conditions. The sixth flip-flop 138 is initially supplied with a "0" setting so that the first bit to be read out (in a right-ward progression) will be the zero desired for the start bit of the telegraph code. All the flip-flops having been instantaneously set so as to store the code group which has just been sensed from a module, the continued rotation of gear 106 causes photodiode 124 to supply spaced advance pulses over conductor 140 to the "shift" control lead of each flip-flop of the shift register, causing the set code to be read out starting with the desired "start" pulse, over output lead 142. As each flip-flop transfers its stored condition to the right, the register is refilled with binary ones from the input 144 to the first stage, so that in the seventh bit position, the desired "stop" pulse will be transmitted, and the register will be left in an all-ones condition ready for the storage of the next code group from the succeeding module 16.

When the carriage 32 reaches the end of the module array, its tripping of microswitch 114 operates control circuit 126 to reverse the motor 110, which drives the carriage idly back to the starting position. The same switch actuation is also utilized to cut off the exciting lamps of the carriage during this return trip and to de-energize the other circuits to avoid false signals and to prolong component life.

FIG. 8 also indicates schematically one way in which the setting, on the first or left-most module 16, of a particular operation, may cause the selective illumination of only a part of the "keyboard." Thus, the module is provided with a shaft extension from its wheel 52, this shaft operating a selector switch 146 for energizing one or more selected module lamps as indicated at 148. It will be obvious that, if desired, microswitches may be placed as desired along the path of the carriage, to perform various auxiliary functions pertinent to the arrival of the carriage at certain points.

Figure 9:
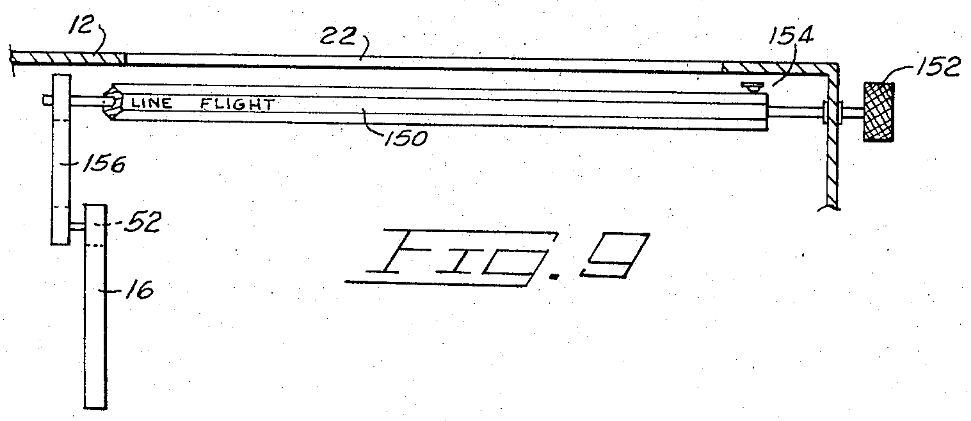
FIG. 9 is a fragmentary view of a modified arrangement by which the columnar format of the apparatus may be altered.

FIG. 9 illustrates one way in which the same module assembly may be converted to different formats of data transmission. Here, the slot 22 in the upper face of the casing overlies a drum 150 of polygonal cross-section, its faces bearing suitable legends to accomodate different message formats. A knob 152 allows the format setting to be changed as desired, and the drum is held in the selected position by a suitable detent 154. If desired, the drum may be made to generate a characteristic code group by linking it, as by a belt 156, to a shaft extension of the wheel 52 of the first module 16. Other modifications of this type will readily be possible in view of this description.

Print-out record of transmission

In many applications, it is desirable to provide a permanent printed record of each transmission. This is easily accomplished with the arrangement shown schematically in FIG. 10. Here, the wheel 52 of a module is shown as connected, by friction gearing 158, to a type wheel 160, so that each module sets its appurtenant type wheel in accordance with its own setting by the operator. This produces, along the module assembly, a line of type composition controlled by the modules. A printed strip record is readily produced by feeding a piece of paper tape, such as pressure responsive tape 162, into position along this line of type characters, and causing the imprinting as by a pressure roller 164 or other contacting or impact-printing means of obvious design.

Where provision for party line operation is included, a "busy" signal lamp indicator 166 may be provided on the console, as in FIG. 1. Also, a changeable indicator, such as a stepping drum 168 bearing legends for the guidance of the user or in answer to typical messages may be included on the top panel. Answer-back facilities may also, of course, include a conventional printer or the like.

What is claimed is:

1. A multiple code-group generating device comprising a plurality of individual flat modules each carrying a closed slidable loop of tape along its periphery, means on each module for urging its tape to a home position on the module, ratchet means on each module for holding the corresponding tape in any selected one of a number of step-wise spaced lengthwise position, a series of differentially-reflecting code spots on a portion of each tape to present at one peripheral area of the tape a code group indication of its position adjustment, a frame for mounting all of said modules in a congruent face-to-face array, and a spot-scanning carriage reciprocably mounted on said frame for sequentially sensing light reflected from the code groups so presented by all of said modules; a rack mounted parallel to the path of travel of said carriage, a threaded element on said carriage in engagement with said rack to drive the carriage in response to rotation of said threaded element, and means forming an abutment on said threaded element for operating a sensing-circuit control switch at a precise carriage position in relation to the code spots of the successive tapes.

2. A multiple code-group generating device in accordance with claim 1, including a shaft of non-circular cross-section paralleling the path of said carriage and slidably passing through a mating hole in said threaded element to rotate the latter.

3. A multiple code-group generating device in accordance with claim 2, in which said shaft forms a rectilinear guide means for said carriage.

4. A code generating device in accordance with claim 1, in which said threaded element comprises a single-turn projecting thread for engaging said rack.

5. A multiple code-group generating device comprising a plurality of individual flat modules each carrying a closed slidable loop of tape along its periphery, a series of differentially-reflecting code spots on a portion of each tape to present at one peripheral area of the tape a code group indication of its position adjustment, a frame for mounting all of said modules in a congruent face-to-face array, and a spot-scanning carriage reciprocably mounted on said frame for sequentially sensing light reflected from the code groups so presented by all of said modules; the code spots of lower reflectively on said tape being constituted as perforations therein, and each of said modules including a light-trapping formation inward of said one peripheral area of the tape when in position to be scanned.

6. A code generating device in accordance with claim 5, including means for making a printed registration of the positions of at least some of said loops of tape.

7. A code generating device in accordance with claim 5, including means for storing the sensing signals produced by said carriage, and means responsive to motion of said carriage for reading out the stored signals.

8. A code generating device in accordance with claim 5, and a changeable legend-bearing indicator positioned adjacent the mounting frame to designate the selected code-sequence format of said modules.

References Cited

UNITED STATES PATENTS

| | | | |
|---|---|---|---|
| 2,137,157 | 11/1938 | Crudo et al. | |
| 2,885,664 | 5/1959 | McCue | 340—365 |
| 2,921,142 | 1/1960 | Tinus. | |
| 2,987,249 | 6/1961 | Van Evechten. | |
| 3,110,014 | 11/1963 | Seyforth | 340—365 |
| 3,140,360 | 7/1964 | Whitworth. | |
| 3,146,439 | 8/1964 | Sedaris | 179—90.2 |

THOMAS A. ROBINSON, Primary Examiner

U.S. Cl. X.R.

179—90; 340—365